United States Patent [19]

Kim et al.

[11] Patent Number: 4,541,995
[45] Date of Patent: Sep. 17, 1985

[54] PROCESS FOR UTILIZING DOUBLY PROMOTED CATALYST WITH HIGH GEOMETRIC SURFACE AREA

[75] Inventors: Gwan Kim, Olney; Carmo J. Pereira, Columbia; Louis Hegedus, Rockville; James M. Maselli, Columbia, all of Md.

[73] Assignee: W. R. Grace & Co., New York, N.Y.

[21] Appl. No.: 670,511

[22] Filed: Nov. 13, 1984

Related U.S. Application Data

[62] Division of Ser. No. 542,440, Oct. 17, 1983, Pat. No. 4,510,262.

[51] Int. Cl.[4] .............................................. B01D 53/36
[52] U.S. Cl. ........................ 423/213.5; 423/DIG. 13; 60/299
[58] Field of Search ................ 423/213.5, DIG. 13; 60/299, 301, 302

[56] References Cited

U.S. PATENT DOCUMENTS 2,212,932  8/1940  Fairlie .................................. 502/527
2,408,164  9/1946  Foster .................................. 502/226
3,907,710  9/1975  Lundsager ....................... 423/213.2
4,476,246 10/1984  Kim et al. ........................ 423/213.5

Primary Examiner—John Doll
Assistant Examiner—Jeffrey Edwin Russel
Attorney, Agent, or Firm—Edward J. Cabic

[57] ABSTRACT

An extrudate catalyst suitable for auto emission control is made from a solid, transitional alumina with a partially hollow interior. Deposited on the extrudate are two promoters, ceria and an alkali metal, and one or more platinum group metals. The preferred alkali metal is in the oxide form as lithia. The cylindrical extrudate has internal reinforcing vanes or ribs extending from the inner wall to the center of the extrudate particle. This configuration permits the catalyst to have the large geometric surface area per reactor volume yet, because of the openings inside the extrudate, the catalyst particles do not exhibit a large pressure drop when packed in a deep bed. These catalysts provide greater hydrocarbon and carbon monoxide conversions than do similar size spherical particles and they have improved light-off characteristics.

7 Claims, 3 Drawing Figures

PROCESS FOR UTILIZING DOUBLY PROMOTED CATALYST WITH HIGH GEOMETRIC SURFACE AREA

CROSS-REFERENCE TO RELATED APPLICATIONS

This is a division of application Ser. No. 542,440, filed Oct. 17, 1983, now U.S. Pat. No. 4,510,262.

U.S. Ser. No. 542,363, filed Oct. 17, 1983, now U.S. Pat. No. 4,510,263, discloses and claims the internally vaned extrudates employed as catalyst supports in this invention.

U.S. Ser. No. 542,346, filed Oct. 17, 1983, now U.S. Pat. No. 4,510,261, discloses and claims the embodiment where the catalyst is used for auto emission control.

BACKGROUND OF THE INVENTION

1. Field of the Invention

This invention relates to an improved catalyst which is suitable for use as a catalyst for auto emission control, especially as a three-way catalyst.

2. Description of the Previously Published Art

Auto emission catalysts have been made from two types of supports. One is a large monolith solid structure which has many channels through it per square inch of cross section. These monoliths are traditionally wash coated with a slip material to provide porosity to increase the surface area. A problem with the monoliths is that they are difficult to replace in a catalytic converter. Furthermore, they are limited in their performance by laminar-flow transport properties.

The other type of support is a particulate material such as a bead or an extrudate. An example of a bead is disclosed in Sanchez U.S. Pat. No. 4,390,456. These beads have been very satisfactory for automobile use. Because of their solid nature and close packing, however, they can present a design problem when making a deep packed catalyst bed. Such a deep bed will exhibit a large pressure drop.

Hollow ceramic pellets for an auto exhaust catalyst support have been suggested by C. B. Lundsager in U.S. Pat. No. 3,907,710. However, the support in the examples was made from cordierite which has a low BET nitrogen surface area. It was thus necessary to coat the cordierite support with an alumina slip which contained a ceria promoter and the catalytic metals such as platinum or palladium. These coated pellets were large with a diameter of 0.25 in. (6.35 mm).

3. Objects of the Invention

It is an object of this invention to provide a doubly promoted catalyst suitable for use as an oxidizing, reducing or three-way catalyst for emission control and especially automotive emission control having good conversion efficiency after a sufficiently long period of aging.

It is a further object of this invention to produce a catalyst suitable for use as an auto emission catalyst where they can be packed in a bed without a large pressure drop across the bed.

It is a further object of this invention to produce a catalyst suitable for use as an auto emission catalyst in the form of a hollow cylindrical extrudate which is internally vaned and where it is not necessary to provide a slip coating on the extruded support.

It is a further object of this invention to produce a catalyst suitable for use as an auto emission catalyst which is made of a transitional alumina extrudate to provide a large internal or BET nitrogen surface area.

It is a further object of this invention to produce a catalyst which is doubly promoted with ceria and an alkali metal to provide good conversion efficiency when used for auto emission control.

It is a further object of this invention to produce a catalyst suitable for use as an auto emission catalyst which has a large geometric surface area per reactor volume.

It is a further object of this invention to convert noxious components of exhaust gas to innocuous entities using the catalyst of this invention.

These and further objects will become apparent as the description of the invention proceeds.

SUMMARY OF THE INVENTION

As disclosed and claimed in U.S. Ser. No. 542,346 filed Oct. 17, 1983, now U.S. Pat. No. 4,510,261, a catalyst which is suitable for auto emission control is made from a solid, transitional alumina extrudate having a partially hollow interior and a catalytically-effective amount of one or more platinum group metals deposited on the extrudate. The extrudate is cylindrical with an annular configuration having internal reinforcing vanes or ribs extending from the inner wall to the center of the extrudate particle. The transitional alumina provides the catalyst with a large BET nitrogen surface area of at least 50 $m^2/g$ with even more preferable value of at least 100 $m^2/g$. The outside diameter can be up to about 6.5 mm for optimum results which is slightly larger than ¼ inch and the aspect ratio, which is the ratio of the length to the diameter, can vary from about 1 to 5 with especially preferred values of 1 to 2. The vanes or ribs inside the cylindrical portion of the extrudate provide at least 25% additional geometric surface area over what would be just the surface area of a hollow tube having the same inside and outside diameter. The pore volume of the catalyst is at least 0.3 $cm^3/g$ with a preferred embodiment having at least 0.5 $cm^3/g$. When the catalyst particles are packed into a reactor the geometric surface area of the catalyst obtained per reactor volume is at least 5 $cm^2/cm^3$ with a more preferred value being at least 20 $cm^2/cm^3$. This extrudate configuration permits the catalyst to have the large geometric surface area per reactor volume yet, because of the openings inside the extrudate, the catalyst particles do not exhibit a large pressure drop when packed in a deep bed.

According to the present invention, the extrudate is doubly promoted with ceria and an alkali metal which in a more preferred embodiment is lithia. These doubly promoted catalysts provide greater hydrocarbon and carbon monoxide conversions than do similar size spherical particles and they have improved light-off characteristics.

DESCRIPTION OF THE PREFERRED EMBODIMENTS

The doubly promoted extrudate according to the present invention is fabricated in the form of a small tubular extruded member having a series of vanes which extend through the center of the axis of rotation of the tubular member. Viewed from the center, they appear as a series of ribs which extend out to the outer tubular element. In the embodiment shown in FIG. 1, there are 4 vanes or ribs and in the embodiment illustrated in FIG. 2 there are 6 vanes or ribs.

This unique geometry produces a structure having a large geometric surface area and a large void fraction. Because the support is made of a transitional alumina it is very porous. The effective surface area is vastly increased over what would be measured from the geometry alone. Moreover, it is also possible to directly impregnate the extrudate with catalytic metals which will adhere directly to the porous surface of the transitional alumina without the need for any washcoat.

Figure 1:
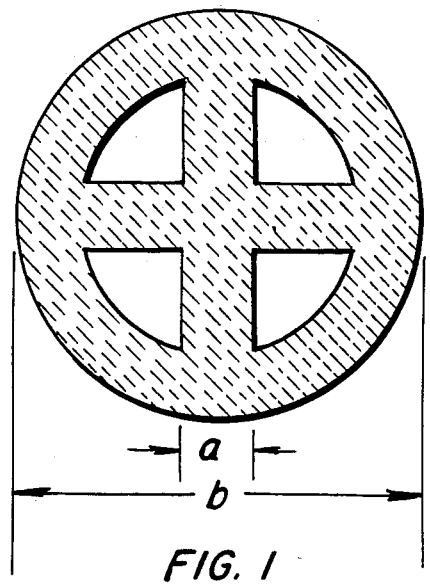
FIG. 1 illustrates a cross-section of one embodiment of the extrudate structure showing 4 vanes or ribs which support the tubular extruded body.

The ribbed extrudates with the hollow interior can be fabricated in various configurations. In FIG. 1 there are 4 internal reinforcing vanes or ribs. The overall diameter, b, can range in size up to about ¼ inch (6.35 mm) which can be rounded up in metric to about 6.5 mm. Smaller sizes can be used with a smaller size of about 1/16 inch (1.59 mm) being near the lower practical limit because it becomes difficult to fabricate hollow extrudates which are significantly smaller in size. An optimum size extrudate with four vanes is the 1/10 inch (2.54 mm) size. The thickness of the vanes can also be varied. Generally, they are from about 0.10 to 0.30 of the diameter with especially preferred values being of from about 0.15 to 0.20 of the diameter.

Figure 2:
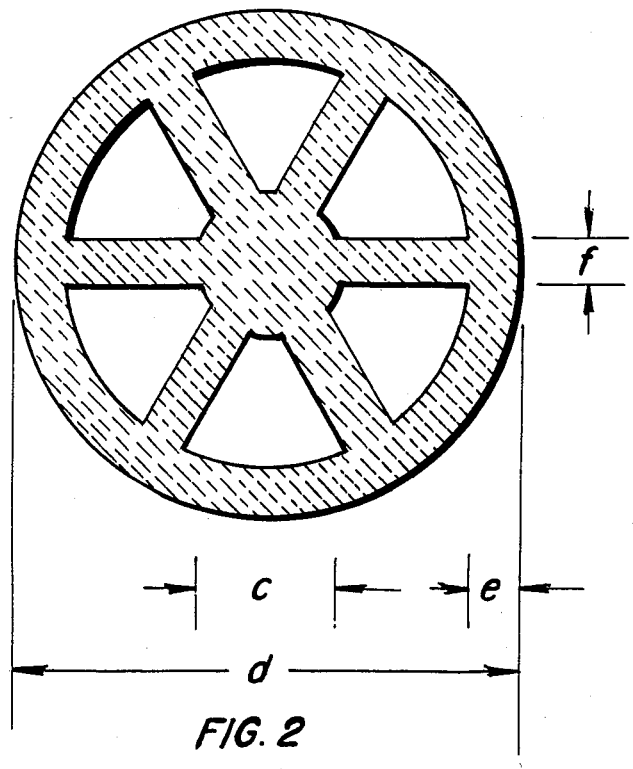
FIG. 2 illustrates a cross-section of another embodiment of the monilith structure showing 6 vanes or ribs which support the tubular extruded structure.

In another embodiment in FIG. 2, a 6-vaned extrudate is formed. Again, the overall diameter, d, can range in size up to about ¼ inch (6.35 mm) which can be rounded up in metric to about 6.5 mm. Smaller sizes can be used with a smaller size of about 1/10 inch (2.54 mm) being near the lower practical limit because it becomes difficult to fabricate hollow extrudates which are significantly smaller in size. An optimum size extrudate with six vanes is the ⅛ inch (3.18 mm) size. Again, the thickness of the vanes can also be varied. Generally, they are from about 0.10 to 0.30 of the diameter with especially preferred values of from about 0.07 to 0.15 of the diameter. In the embodiment illustrated in FIG. 2, the die has been configured so that where the vanes come together they form a circular hub which has a diameter, c, which can be adjusted in size. The hub is an optional structural feature to provide additional crush strength for the extrudate. It can be used with either the 4 or the 6-vaned embodiments.

The thickness of the wall of the extrudate, shown as e in FIG. 2, can also be varied. The thicker the wall, the stronger will be the extrudate in terms of crush strength. Generally, it is preferred to have a wall thickness which is about 0.10 to about 0.30 of the diameter of the extrudate based on calculations to be made infra for the optimum design of the extrudate when subjected to parallel reactions which are controlled by external mass transfer and by kinetics. It is our experience that an even more preferred ratio is from about 0.15 to about 0.20.

The aspect ratio is the ratio of the length of the particle to its diameter. Aspect ratios can vary from 1 to 5 with generally preferred aspect ratios of 1 to 2.

The optimum design of the extrudate according to the present invention in terms of the ratio of the cylindrical wall thickness to the extrudate diameter where the wall and the vane have the same thickness can be made for reacting systems containing independent parallel reactions that are controlled by external mass transfer or by reaction kinetics.

For extrusions whose external dimensions are given by a diameter, d, and length, L, and a fixed density, the reactant concentration, c, for an isothermal first-order reaction in a plug-flow tubular reactor is given by $$dc/dx = -kc/SV \tag{1}$$

where
k is the rate constant, 1/sec
SV is the space velocity, $cm^3/cm^3$-sec
x is the fractional position in the bed In the case of an impregnated 4-ribbed extrudate under reaction control, the effectiveness factor defined as the ratio of the actual reaction rate to the rate in the absence of diffusional resistances is unity and $$k = k_r(1 - \epsilon_{int})(1 - \epsilon_o) \tag{2}$$

where,
$\epsilon_o$ is the void fraction in between extrudates
$k_r$ is the rate constant defined on a catalyst volume basis and is constant when the $cm^2$ of metals per volume of catalyst is invariant.
$\epsilon_{int}$ is the void fraction within the extrusion and is approximated using geometric considerations by $$\epsilon_{int} = \left[ (1 - 2x)^2 - \frac{4x}{\pi}(2 - 5x) \right] \tag{3}$$

where,
x = t/d
t = thickness of the vane

As given in equations (1)–(3), for kinetically controlled reactions increasing internal voidage reduces the volume of catalyst in the reactor and decreases reactant conversion given by $$\chi = 1 - \exp\left[-\frac{k}{SV}\right] \tag{4}$$

Figure 3:
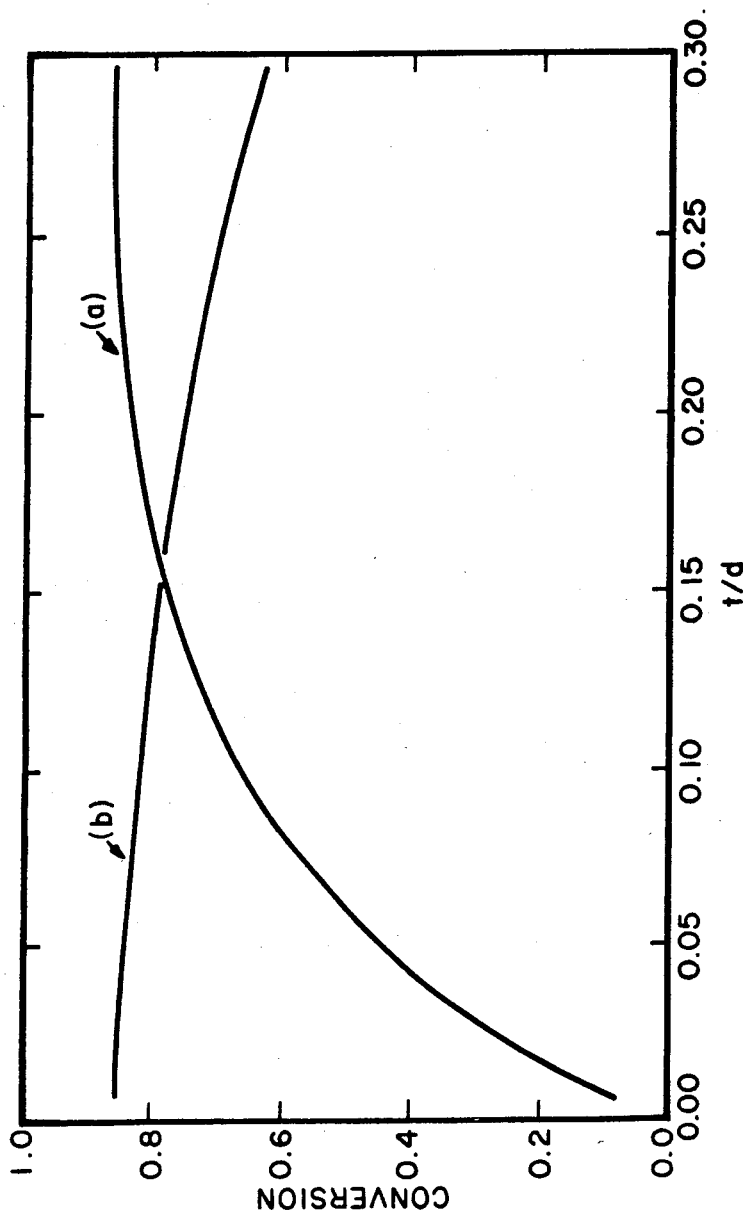
FIG. 3 illustrates design aspects for the extrudate in the presence of kinetic and externally diffusion controlled reactions.

This situation is depicted schematically in FIG. 3, curve (a).

For external transport limited reactions, or when the dominant resistance is interparticle mass transfer limited, the reactor concentration profile is given by equation (1) with $$k = k_m a_r \tag{5}$$

where,
$k_m$ = mass transfer coefficient, cm/sec
$a_r$ = geometric surface area per reactor volume, $cm^2/cm^3$ and $$a_r = (1 - \epsilon_o)(1 - \epsilon_{int})\frac{S_x}{V_a} \tag{6}$$

$S_x/V_a$ = geometric surface area per volume of alumina $a_r$ can be approximated using geometric considerations as, $$\frac{(1-\epsilon_o)}{d}\left[4 + \frac{16}{\pi}\left(\frac{\pi}{4}(1-2x)+(1-4x)\right) + \frac{2d}{L}(1-\epsilon_{int})\right] \quad (7)$$

From equations (1), (3), (4)–(7), for external transport limited reactions, in extrudates of the same external geometry, increasing internal extrudate voidage (by decreasing wall thickness) results in an increase in external surface area per reactor volume, $a_r$, and conversion increases. This is shown as curve (b) in FIG. 3.

Thus optimal extrudate shape and wall thickness can be prescribed depending on whether the primary reaction is kinetically on interphase diffusion controlled. In automobile exhaust, under lean conditions the conversion of CO and hydrocarbons (HC) are external, mass transfer controlled. Under rich conditions, they are reaction controlled, especially CO and NO. Thus, for reactors with both types of reactions occurring, an optimal extrudate wall thickness can be chosen such that conversion of both types of reactions is maximized. Optimal t/d ratios of from 0.10 to 0.30 are advantageous with especially preferred values of 0.15 to 0.20 as shown in FIG. 3.

The extrudate support can be characterized in terms of pore structure, pore radius and pore volume by the mercury penetration technique using pressures up to and over 60,000 psig which is well known in the art as mercury porosimetry. A Micromeritics Auto-Pore 9200 porosimeter is used with the results plotted to show the cumulative volume of mercury penetration per gram of sample on the vertical axis and the porosimeter pressure on the horizontal axis on a logarithmic scale. The present extrudate support is bimodal with two types of pores which are the micropores and the macropores. The porosimeter curve for the bimodal support shows two steps. The inflection point between the ends of the first step starting from the origin of the curve represents the breakpoint between the macropores and the micropores in the support, the portion of the curve to the left of the inflection point representing the macropore structure and that to the right representing the micropore structure. The pore radius for the two types of pores can be directly calculated from the pressure applied in the test for any given pressure. The cumulative macro and micropore volumes in cc/g. may be read directly from the curve. The pore radius and volume information is then used to calculate the integral average values for the pore radii. The integral averaging for the macropores proceeds from 0 to the macropore volume as discussed above while that for the micropores proceeds from the macropore volume to the total volume. The details of the test and of curve analysis and calculations are fully set forth in, among others, "Chemical Engineering Kinetics" by J. M. Smith, McGraw-Hill Publishing Company, New York, Second Edition, 1970.

A significant advantage of these ribbed extrudates over conventional spheres is their ability to both provide a large geometric surface area per packed volume of reactor and to provide a lower pressure drop across the bed than is obtained by spheres having a comparable geometric surface area per packed volume. To determine pressure drops 50 $cm^3$ samples of the 4-vaned extrudate according to the present invention and three different sizes of spheres were each placed in a glass tube (ID=2.16 cm) having a glass frit at the bottom. The tube diameter was over 7 times the diameter of the largest particle tested, thus minimizing wall effects. Catalyst pellets were screened to remove fines. The support was periodically unloaded and the empty tube pressure-drop measured to ensure that there was no frit plugging. Bed pressure drops were measured using a U-tube manometer. From the calibration curves for the empty tube and the pressure drop in a tube packed with catalyst, the pressure drop across the support alone was obtained by difference.

The variation of bed-pressure drop (in cm of $H_2O$/cm bed) is shown as a function of the superficial velocity of air at 25° C. and 1 atm in Table 1.

TABLE 1

| | Catalyst Bed Pressure Drop | | | |
|---|---|---|---|---|
| Superficial velocity, (cm/sec) | 3/32 inch 4-vaned extrudate | 1/10 inch spheres | 1/16 inch spheres | 1/32 inch spheres |
| 5.1 | .02 | .04 | .12 | .18 |
| 13.4 | .06 | .08 | .21 | .51 |
| 21.9 | .10 | .16 | .34 | .83 |
| 29.3 | .15 | .24 | .45 | 1.17 |
| 37.5 | .18 | .31 | .61 | 1.58 |
| 45.2 | .25 | .40 | .80 | 2.03 |
| 53.2 | .32 | .51 | 1.00 | 2.51 |
| 60.7 | .40 | .61 | 1.19 | 3.07 |
| 133.0 | .94 | 1.58 | 4.06 | 9.11 |

The data in Table 1 clearly show that for each superficial velocity there is a lower pressure drop for the extrudate than for any of the spheres of the same nominal size or smaller.

The optimal pressure drop comparison should be made for a sphere having the same geometric surface area per packed volume. To determine the diameter of such a sphere the surface area per reactor volume of the extrudate is first calculated as follows. For L=0.3424 cm and d=0.2680 cm the volume of the cylinder extrusion is given by $$\frac{\pi}{4}d^2L$$

The number of 4-vaned extrudates per $cm^3$ of packed volume is measured as 39.1. From this $\epsilon_o$, the void fraction between extrudates, is calculated to be 0.245. For the 4-vaned extrusion, $x = t/d = 0.151$ and $a_r$ is calculated using equation (7) to be 28.13 $cm^{-1}$. In the calculation of equivalent sphere size we use $$a_{r,sphere} = (1-\epsilon_o)6/d_{sphere}$$

Since packed beds containing spheres have $\epsilon_o = 0.38$, the equivalent sphere diameter is calculated as 1/20 (1.32 mm).

Thus the sphere to be compared to the extrudate is one having a diameter of 1/20 inch (1.32 mm). Although there is not one of this size in Table 1, the pressure drop value for such a sphere would be between the values of the 1/16 inch and the 1/32 inch sphere. Just comparing the extrudate with the 1/16 inch spheres shows a factor of 3-7 times less pressure drop for the extrudates according to the present invention.

In Table 2 below, the pressure drop values for 1/20 inch spheres have been obtained from Table 1 data by interpolation between 1/16 inch and 1/32 inch spheres.

TABLE 2

| Catalyst Bed Pressure Drop | | |
|---|---|---|
| Superficial velocity, (cm/sec) | 3/32 inch 4-vaned extrudate | 1/20 inch spheres |
| 5.1 | .02 | .14 |
| 13.4 | .06 | .32 |
| 21.9 | .10 | .49 |
| 29.3 | .15 | .68 |
| 37.5 | .18 | .90 |
| 45.2 | .25 | 1.2 |
| 53.2 | .32 | 1.5 |
| 60.7 | .40 | 1.70 |
| 133.0 | .94 | 5.8 |

The pressure drop for the extrudate according to the present invention is 4–7 times less than the corresponding extrapolated pressure drops for sphere with 1/20 inch diameter.

When making catalysts according to the present invention the amount of $CeO_2$ promoter applied is preferably between 1 to 10 wt. % and more preferably between 2–6 wt. %. The amount of the alkali metal promoter applied, expressed as the weight percent of the oxide $M_2O$, is any effective amount up to about 5 wt. % and more preferably from about 0.5 to 3 wt. %. The preferred alkali metal is lithium which in the oxide form is lithia.

The platinum group metal component may be platinum, palladium, rhodium, ruthenium, iridium, osmium, and mixtures thereof, with the preferred metals being Pt, Pd, Rh either alone or in any combination. When the platinum group metal contains more than one of such components, the component may be composed of a major amount of platinum or palladium and a minor amount of one or more of the other platinum group metals such as rhodium. The catalytic metals mixture may comprise from about 1 to about 15 wt. % rhodium and from about 85 to about 99 wt. % platinum, palladium, or mixtures thereof and preferably from about 5 to 10 wt. % rhodium and about 90 to 95 wt. % platinum, palladium, or mixtures thereof.

Various compounds, complexes, or fine metal dispersions of any of the platinum group metals in aqueous or organic medium may be used to achieve deposition of the platinum group metal component on the composite. A suitable liquid medium will not react with the platinum group metal component and is removable on drying which can be accomplished as part of the preparation or in use of the catalyst. Water soluble platinum group metal compounds or complexes may conveniently be used. Suitable platinum group metal compounds include chloroplatinic acid, potassium platinum chloride, ammonium platinum thiocyanate, platinum tetrammine hydroxide, platinum group metal chlorides, oxides, sulfides, nitrites and nitrates, platinum tetrammine chloride, palladium tetrammine chloride, sodium palladium chloride, hexammine rhodium chloride, and hexammine iridium chloride.

In a preferred embodiment of this invention, the impregnation solution contains an ammonium sulfito complex of platinum group metal prepared according to the methods described in U.S. Pat. No. 3,932,309 to Graham et al. The use of these complexes provides excellent dispersion and control of penetration depth of the platinum group metal. Preferably, rhodium is incorporated in the catalyst by impregnation with an acid rhodium sulfito complex prepared by reacting rhodium trichloride or rhodium hydrous oxide with sulfurous acid.

After the impregnations are completed, the composition may be dried, for example, at a temperature of from about 100° C. to about 150° C. for about 2 to about 20 hours. The salt composition may be decomposed and the catalyst activated under conditions which provide a composition having characteristics that enhance the desired reaction. The temperature of this activation is low enough to permit neither noble metal sintering nor sintering of the support. It is preferably done in a reducing atmosphere, e.g., by about a 1 hour reduction in flowing nitrogen containing 5 volume percent hydrogen at about 250°–550° C. and more preferably at about 400° C.

In the catalyst of this invention, the platinum group metals provide catalytic sites for oxidation, reduction and decomposition reactions and are present in amounts sufficient to maintain long term activity for catalyzing these reactions. Generally, the amount of platinum group metal used is a minor portion of the catalyst composite and typically does not exceed about 10 weight percent of the calcined composite. The amount may be about 0.05 to 10 percent and is preferably about 0.1 to 6 percent based on the weight of the calcined composite to maintain good activity with prolonged use.

In order to demonstrate the superiority of the auto exhaust catalyst according to the present invention, a series of tests have been performed. The complete details of the procedures are set forth in a later section entitled Test Procedures.

To measure the long term performance of the catalyst, pulsator aging tests have been employed which simulate engine conditions. The test subjects the catalyst to alternating oxidizing and reducing conditions over a period of time with a fuel feed which contains an increased level of poisons, such as Pb, P and S.

After the catalysts have been aged, various evaluation tests are employed. In one test, the HC, CO and $NO_x$ conversions are measured at the stoichiometric point as well as under lean and rich conditions to determine the three-way performance of the catalyst. The results are shown in Table 5 and again, the catalyst according to the present invention had better conversions than conventional beads.

Another test performed on the pulsator aged catalyst is an oxidizing warm-up test. This test measures the light-off properties to determine the extent of permanent deactivation. The test is done under oxidizing conditions and the time for 50% conversion of CO and HC is measured as well as the HC and CO conversion efficiencies and the time required to attain from 10% to 90% CO conversion. The results presented in Table 6 also show superior performance for the present catalyst.

Having described the basic aspects of the invention, the following examples are given to illustrate specific embodiments thereof.

EXAMPLE 1

The extrudate support was made as follows. Into a bench mix muller was added 490 g of pseudo boehmite made according to the procedure in the M. G. Sanchez and N. R. Laine U.S. Pat. No. 4,154,812 which was dried at about 135° C. to a TV of 29.23%, 10 g of Methocel (made by Dow Chemical Co.), and about 200 ml of deionized water. The mixture was mulled for 10 minutes, followed by the addition of another 200 ml of water and further mulling for a total of 45 minutes. The mixture was extruded through a ⅛ inch inside diameter die with four inserts at a pressure of about 2500–3000 psi. The extrudates having the cross section shown in FIG. 1 were oven dried at 116° C. overnight. These dried extrudates were used to make catalysts in the following examples.

To further characterize the extrudates, a portion was calcined at 538° C. for 3 hours. The average diameter was 0.1105 inch (2.81 mm) and the average length was 0.1386 inch (3.52 mm), giving an aspect ratio of 1.25. The density was 0.442 g/cc.

EXAMPLE 2

This example prepares extrudate catalysts for comparison which are only promoted with ceria.

The extrudates from Example 1 were activated at 538° C. for 3 hours. A batch of these activated extrudates was then air calcined for 2 hours at 982° C. A 20.10 g portion of this material was contacted with 30.0 cc of cerous nitrate solution containing 0.622 g of $CeO_2$ as follows. The extrudates were allowed to soak for 15 min. at room temperature after dropping into the solution, followed by thorough mixing under the overwet condition. It was first slowly dried at 70° C. for 1 hour, with gentle mixing once every 10 min. so that most of the excess solution, amounting to about 120% of incipient wetness, could be picked up by the extrudates. It was then dried overnight at 135° C. before air calcination at 732° C. for 1 hour.

The rhodium stock solution, which as an acid in-situ sufito complex solution containing 2 g of Rh per Kg of solution, was prepared as follows. 11.06 g of sulfurous acid containing 3.38% $SO_2$ was added to 60.00 g of deionized water in a polyethylene bottle. To this was added 1.0404 g of $RhCl_3$ solution bearing a total of 200 mg Rh, and the solution was diluted to exactly 100.00 g. The solution was sealed in the bottle, and then soaked in 60° C. water for 2 hours, with occasional agitation. The solution was cooled to room temperature before use.

The above resulting extrudates promoted with 3 wt. % $CeO_2$ were loaded with Pt and Rh as follows. Exactly 20.01 g (40.2 cc) of the ceria-promoted extrudates were contacted by soaking with 25.0 cc of solution containing 9.27 mg of Pt in the form of $(NH_4)_6 Pt(SO_3)_4$. See the Graham et al U.S. Pat. No. 3,932,309 which shows how to prepare this solution. It was dried in the same manner as in the ceria incorporation step, i.e., two-step drying at 70° and 135° C. The extrudates were resoaked in 22 cc of solution bearing 23.82 mg of Pt in the form of $(NH_4)_6 Pt(SO_3)_4$ and 1.99 mg of Rh in the form of acid in-situ sulfito complex solution of Rh obtained by diluting the stock solution. Finally the catalyst was activated by 1-hour reduction at 400° C. in flowing $N_2$ containing 5 vol. % $H_2$. The resulting catalyst had physical properties as set forth in Table 3 infra. The metals loading of this catalyst in terms of g of each metal per liter of packed volume is 0.791 Pt and 0.0475 Rh excluding the 4% excess allowed to compensate for the possible metal losses.

EXAMPLE 3

This example prepares spherical catalysts for comparison which are only promoted with ceria.

Grace alumina beads made according to the procedure in M. G. Sanchez and N. R. Laine U.S. Pat. No. 4,179,408 were dried at 135° C. for at least 3 hours and were air calcined at 1038° C. for one hour. A large batch of these calcined beads were impregnated to incipient wetness with a cerous nitrate solution, dried at 135° C. for at least 3 hours, and then air calcined at 732° C. for one hour to obtain alumina beads promoted with 3 wt. % $CeO_2$. A portion of the resulting beads in the size range between 5 and 10 meshes having 3.0 mm major and 2.6 mm minor axes, were converted to a Pt-Rh catalyst loaded with 0.791 g Pt and 0.0475 g Rh per liter of catalyst as follows, allowing 4% excess metals in order to compensate for the possible metals loss. 7,942 g of ceria-promoted beads were sprayed in a rotary mixer with fine mist of 6,800 cc of $(NH_4)_6 Pt(SO_3)_4$ solution bearing 3.786 g of Pt. See the Graham et al U.S. Pat. No. 3,932,309 which shows how to prepare this solution. The beads were then dried overnight at 135°.

In the meantime, a batch of acid in-situ sulfito complex solution of Rh was readied as follows. To 300 cc of 60° C. water in bottle was added 23.47 g of sulfurous acid containing 6.78 wt. % $SO_2$. To this was then added 17.350 g of $RhCl_3$ solution containing 4.676 wt. % Rh. After diluting with water to 405 cc, the bottle was sealed and placed in a 60° C. water bath for a 1 hour soak. It was then cooled to room temperature before use.

The above-dried beads were resprayed in the same manner with 6,400 cc of solution bearing 9.375 g of Pt and 0.811 g of Rh. The impregnating solution was prepared as follows: 105.601 g of $(NH_4)_6 Pt(SO_3)_4$ solution containing 9.219 wt. % Pt was diluted with water along with the entire batch of the above-prepared acid in-situ solution of Rh to 6,400 cc the resulting solution had a pH of 2.46.

After drying once again at 135° C., the beads were reduced in flowing $N_2$ containing 5 vol. % $H_2$ for 1 hour at 400° C. The physical properties for the beads are given in Table 3.

A comparison of the impregnated extrudate of Example 2 with the similarly impregnated sphere of Example 3 is given in Table 3.

TABLE 3

Comparison of 4-Ribbed Extrudate and Sphere Catalysts

|  | Sphere | 4-Vaned Extrudate |
|---|---|---|
| Pore volume, $cm^3/g$ | 0.994 | 0.606 |
| Macropore volume, $cm^3/g$ | 0.380 | 0.041 |
| Micropore volume, $cm^3/g$ | 0.614 | 0.565 |
| Macropore radius, microns | 0.420 | 34.0 |
| Micropore radius, AU | 65.2 | 58.0 |
| Pellet density, $g/cm^3$ | 0.766 | 1.089 |
| BET ($N_2$) Surface area, $m^2/g$ | 114 | 162 |
| Bulk density, $g/cm^3$ | 0.475 | 0.498 |
| Average length, mm[1] | 3.02 | 3.42 |
| Average diameter, mm[2] | 2.62 | 2.68 |
| Geometric surface area per pellet, $cm^2$ | 0.31 | 0.71 |
| Number of pellets per $cm^3$ of packed reactor volume | 49.5 | 39.1 |
| Geometric surface area per packed reactor volume, $cm^{-1}$ | 15 | 28 | where AU = Angstrom units
[1] Major axis diameter
[2] Minor axis diameter
The micropore region is:
0–200 AU for extrudate
0–600 AU for sphere Although the spheres and extrudates have comparable diameters and lengths, because of the hollow nature of the extrudates, there is a significantly larger geometric surface area per packed volume for the extrudate which is almost double the value for the sphere.

EXAMPLE 4

In this example, ceria-lithia promoted extrudate catalysts are made according to the present invention. Another batch of Pt-Rh catalyst supported on the extrudates of Example 1 was prepared essentially in the same manner as in Example 2 using the soaking procedure as follows. A batch of 454° C. activated extrudates with 20.08 g dry weight was contacted with 25 cc of solution containing 0.634 g of $CeO_2$ and 0.423 g of $Li_2O$ in the form of cerous nitrate and lithium nitrate. As in Example 2, the extrudates were well mixed immediately after contacting. They were then treated in exactly the same manner as in the ceria incorporation step as in Example 2, i.e. room temperature soak, 70° and 135° C. drying, and then air calcination at 982° C. for 2 hours. The additive loadings in the resulting material are 3 wt. % $CeO_2$ and 2 wt. % $Li_2O$.

The above ceria-lithia-promoted extrudates were loaded with Pt and Rh using the soaking procedure in a manner slightly different from the procedure described in Example 2. A 20.08 g (40.2 cc) batch of this doubly promoted extrudates were contacted first with 20 cc of solution containing 1.99 mg of Rh in the form of acid in-situ sulfito complex solution and 0.14 millimole of dibasic ammonium citrate solution. After 15 min. soak at room temperature and the two-step drying at 70° and 135° C., the extrudates were resoaked in 19 cc solution bearing 33.09 mg Pt in the form of $(NH_4)_6 Pt(SO_3)_4$. It was soaked at room temperature and dried in the same fashion before finally activating by 1 hour reduction in flowing $H_2$ (5 vol. %)/$N_2$ (95 vol. %) at 400° C. The resulting catalyst had a bulk density of 0.480 g/cc and a BET ($N_2$) surface area of 129 m$^2$/g. The metals loading of this catalyst, g of metals per unit volume is identical to that of the catalyst in Example 2.

EXAMPLE 5

This example prepares spherical catalysts for comparison which are doubly promoted with ceria and lithia.

A large batch of activated Grace alumina beads obtained by 135° C. drying overnight and 454° C. air calcination was promoted with 3 wt. % $CeO_2$ and 2 wt. % $Li_2O$ by incipient wetness impregnation with a mixed solution containing both cerous and lithium nitrates, followed by 135° C. drying overnight and 1 hour air calcination at 1038° C. 7,782 g of the resulting beads in the size range between 5 and 10 meshes, having 3.1 mm major and 2.6 mm minor axes, were sprayed with 6,800 cc of solution containing Pt in the same manner as described in Example 3. The impregnating solution was prepared as follows. To 3,000 cc of water was added 53.06 g of ammonium bisulfite solution containing 47.49% $NH_4HSO_3$. The resulting solution was raised to a pH of 8.30 from 5.84 using an $NH_4OH$ solution. To this was then added 45.959 g of chloroplatinic acid solution containing 20.593 wt. % Pt. The solution had a pH of 2.32. The solution was allowed to stand at room temperature for 2 hours, resulting in colorless solution. Finally, the solution was diluted with water to 6,800 cc.

After 135° C. air drying overnight, the beads were resprayed with 6,400 cc of solution bearing 4.056 g of Pt and 0.811 g of Rh. This impregnating solution was prepared as follows. To 1,200 cc of water was added 22.78 g of ammonium bisulfite solution containing 47.49 wt. % $NH_4HSO_3$. After raising the pH of this solution to 8.30 from 5.81 using an $NH_4OH$ solution, 19.693 g of chloroplatinic acid solution containing 20.593 wt. % Pt was added and mixed. The resulting solution had a pH of 2.29. Two hours later this solution was mixed with 405 cc of acid in-situ sulfito complex solution of Rh which was prepared in exactly the same manner as in Example 2. The mixed solution was then diluted to 6,400 cc, adjusting pH to 2.20 from 2.00 with $NH_4OH$.

Finally, the beads were dried overnight at 135° C., and then activated by 1 hour reduction in flowing $N_2$ containing 5 vol. % $H_2$ at 400° C. The metals loading, g of metals per liter of catalyst, for this batch is identical to that of catalyst in Example 2.

EXAMPLE 6

An 8.5 cc sample each of the catalysts made in Examples 2-5 was subjected to accelerated aging on a pair of pulse flame combustors or "pulsators" for periods of 45 and 90 hours, at approximately 60 pulses/minute using n-hexane containing 0.132 g/liter Pb, 0.05 g/liter P, and 0.08 wt. % S. The apparatus for this procedure is described by M. V. Ernest and G. Kim in Soc. Automot. Eng. Paper No. 800083. During the period of aging the catalyst samples were allowed to experience cycling temperatures. The cycle consisted of a lower temperature of 566° C. which was maintained for 75 minutes and then a higher temperature of 732° C. which was maintained for 15 minutes.

Each catalyst sample was then evaluated by the "Perturbed Sweep Test" procedure described in Ind. Eng. Chem. Prod. Res. Dev., 21, 267 (1982), using the simulated exhaust gas feed shown in Table 4.

TABLE 4

| Simulated Auto Exhaust Gas Mixture for the "Perturbed Sweep Test" | |
|---|---|
| Gas | Vol. % |
| HC$^a$ | 0.0400 |
| CO | 0.295–0.80 |
| H$_2$ | 0.098–0.267 |
| NO | 0.185 |
| SO$_2$ | 0.0020 |
| O$_2$ | 0.245–0.725 |
| CO$_2$ | 14.5 |
| H$_2$O | 10.0 |
| N$_2$ | balance |

$^a$A mixture of $C_3H_6$ and $C_3H_8$ at a molar ratio of $C_3H_6/C_3H_8 = 4/1$.

The average reducing or oxidizing condition of the feed mixture is represented by the ratio R given below:

$$R = \frac{[O_2] + 0.5 [NO]}{\frac{2}{3} [CO] + [C_3H_8] + 4.5 [C_3H_6]}$$

where $[O_2]$, $[NO]$, $[CO]$, $[C_3H_8]$ and $[C_3H_6]$ are the molar concentrations in the feed gas. The conversions of HC, CO and NO are determined as a function of the ratio R. A constant inlet temperature of 482° C. is maintained throughout the test with a GHSV of approximately 60,000 and a superficial linear velocity of about 49 cm/sec in the reactor.

The results presented in Table 5 represent TWC performance under a lean (R=1.5), stoichiometric (R=1.0), and a rich (R=0.7) conditions.

TABLE 5

Performance of Pulsator-Aged Catalysts in TWC Tests[a] at Approximately 60,000 GHSV

| Support In Example | Shape | Promoters (Wt. %) | Aged (Hrs.) | Rich (R = 0.7) HC | CO | NO | Stoichiometric (R = 1.0) HC | CO | NO | Lean (R = 1.5) HC | CO | NO |
|---|---|---|---|---|---|---|---|---|---|---|---|---|
| 2 | Extrudate | 3% CeO$_2$ | 0 | 94 | 74 | 85 | 96 | 85 | 73 | 98 | 92 | 51 |
|   |           |            | 45 | 89 | 48 | 74 | 90 | 59 | 62 | 90 | 72 | 43 |
|   |           |            | 90 | 78 | 34 | 62 | 82 | 42 | 54 | 83 | 54 | 33 |
| 3 | Bead | 3% CeO$_2$ | 0 | 93 | 69 | 82 | 96 | 81 | 68 | 96 | 89 | 50 |
|   |      |            | 45 | 78 | 44 | 70 | 81 | 53 | 57 | 82 | 66 | 38 |
|   |      |            | 90 | 66 | 34 | 52 | 70 | 42 | 44 | 71 | 54 | 28 |
| 4 | Extrudate | 3% CeO$_2$ 2% LiO$_2$ | 0 | 94 | 70 | 83 | 96 | 81 | 73 | 96 | 90 | 47 |
|   |           |                        | 45 | 86 | 60 | 77 | 86 | 72 | 62 | 85 | 79 | 41 |
|   |           |                        | 90 | 77 | 50 | 70 | 81 | 61 | 60 | 82 | 72 | 43 |
| 5 | Bead | 3% CeO$_2$ 2% LiO$_2$ | 0 | 91 | 56 | 87 | 94 | 73 | 78 | 95 | 84 | 50 |
|   |      |                        | 45 | 79 | 40 | 71 | 83 | 50 | 61 | 83 | 66 | 42 |
|   |      |                        | 90 | 73 | 40 | 63 | 77 | 49 | 51 | 79 | 63 | 32 |

[a]The values for HC, CO and NO are the percent conversion of these three components. The higher the value the better.

It is apparent from these data that the internally vaned extrudate catalyst according to the present invention is superior to the bead catalysts currently available. The extrudate catalyst doubly promoted with Li$_2$O-CeO$_2$ far exceeds the aging performance of both Li$_2$O-CeO$_2$ promoted beads or the Ce-promoted beads. For example, under the stoichiometric condition (R=1.0) the Li$_2$O-CeO$_2$-promoted extrudate catalyst of Example 4 exhibits HC, CO and NO conversion efficiencies of 81%, 61%, and 60%, respectively, after aging for 90 hours. The CeO$_2$-promoted bead of Example 3 had much lower conversion efficiencies of 70%, 42% and 44%. Even the Li$_2$O-CeO$_2$-promoted beads of Example 5, had lower performance of only 77%, 49%, 51%, respectively, for the three pollutants.

The superiority of the Li$_2$O-CeO$_2$-promoted extrudate catalyst of the present invention in Example 4 over the CeO$_2$-promoted extrusion catalyst in Example 2 is especially seen in CO performance. After 90 hours of aging, the CO conversions for R=0.7, 1.0 and 1.5 are 34%, 42% and 54% for the ceria promoted extrudate of Example 2, whereas much higher values of 50%, 61% and 72% are achieved, respectively, for the LiO$_2$-CeO$_2$ promoted extrudates of Example 4.

EXAMPLE 7

The fresh catalysts from Examples 2–5 and these same catalysts which had been pulsator aged by the procedure of Example 6 were subjected to the oxidizing warm-up test. This test is used to determine the extent of permanent deactivation. It basically utilizes the test described by M. V. Ernest and G. Kim in Soc. Automot. Eng. Paper No. 800083. The test involves a scaled-down version of a full size converter test which is designed to measure both the lightoff characteristics of a catalyst as well as steady-state CO and HC conversion efficiencies. In the procedure the catalyst, initially at ambient temperature, is contacted with a preheated gas mixture consisting of 3 vol. % CO, 4.5% O$_2$, 10% H$_2$O, 433 ppm C$_3$H$_8$ and the balance N$_2$. Because of the high level of oxidizable species present in the feed, the temperature of the catalyst bed rises depending upon the activity of the catalyst. These catalysts were tested at a GHSV of 59,000 and a superficial linear velocity of 40 cm/sec. The results are set forth in Table 6.

TABLE 6

(Source: Table II July 8 Report)
Performance[a] of Fresh and Aged Catalysts in Oxidizing Warm-up Tests at Approximately 38,500 GHSV

| Support in Example | Form[c] | Promoters (Wt. %) | Aged (Hrs.) | Δt (sec) | t$_{50}$CO (sec) | t$_{50}$C$_3$H$_8$ (sec) | Eff. C$_3$H$_8$ % | Eff. CO (%) |
|---|---|---|---|---|---|---|---|---|
| 2 | E | 3% CeO$_2$ | 0 | 19 | 56 | 71 | 86 | 99+ |
|   |   |            | 90 | 25 | 90 | [b] | 49 | 98 |
| 3 | B | 3% CeO$_2$ | 0 | 18 | 46 | 62 | 84 | 99+ |
|   |   |            | 90 | 104 | 98 | [b] | 36 | 92 |
| 4 | E | 3% CeO$_2$ 2% LiO$_2$ | 0 | 20 | 56 | 89 | 79 | 99+ |
|   |   |                        | 90 | 30 | 95 | [b] | 48 | 96.4 |
| 5 | B | 3% CeO$_2$ 2% LiO$_2$ | 0 | 18 | 55 | 65 | 87 | 99+ |
|   |   |                        | 90 | 19 | 102 | [b] | 36 | 95 |

[a]Δt = Time required to attain 90% conversion from 10% conversion of CO.
t$_{50}$ = Time required to attain 50% conversion.
Eff. = % conversion attained under a steady-state condition.
[b]Unavailable because the % conversion required was not attained.
[c]E = extrudate
B = bead The oxidizing warm-up test data for the aged catalysts in Table 6 also show the better performance of the ceria-lithia promoted extrudates over the beads. The t$_{50}$ CO is lower for the 90 hour aged extrudate of Example 4 with 95 sec. compared to the 102 sec. for the bead of Example 5. The HC conversion for the extrudate of Example 4 is 48% compared to 36% for the bead and the CO conversion was 96.4% compared to 95% for the bead.

Focusing on the increase in CO conversion, for the doubly promoted ceria-lithia system, the beads in Example 5 had a conversion of 95% which means that 5% of the CO was not converted. By using the extrudate the CO conversion was 96.4% which means that only 3.6% of the CO was not converted. To be able to reduce the amount of unwanted unconverted CO from 5% to 3.6% represents a 28% reduction in CO emission which is a significant improvement in exhaust quality.

It is understood that the foregoing detailed description is given merely by way of illustration and that many variations may be made therein without departing from the spirit of this invention.

What is claimed is:

1. A method of converting noxious components of exhaust gas to innocuous entities, said noxious components comprising carbon monoxide, hydrocarbons, and nitrogen oxides, which comprises contacting said gases with a catalyst comprising a solid, transitional alumina extrudate support structure having a cylindrical, hollow annular configuration with internal reinforcing vanes, a nitrogen surface area of at least 50 $m^2/g$; a diameter of up to about 6.5 mm; an aspect ratio of the length to the diameter of from about 1 to 5; a geometric surface area of at least 25% greater than a hollow tube of the same inside and outside diameter; a porosity of at least 0.3 $cm^3/g$; a surface area per reactor volume of at least 5 $cm^2/cm^3$, and deposited directly on the support structure without having any washcoat present from about 1-10 wt. % ceria, an alkali metal promoter expressed as the wt. % of the oxide $M_2O$ in an effective amount up to about 5% and a catalytically-effective amount of one or more platinum group metals.

2. A method of converting noxious components of exhaust gas to innocuous entities which comprises contacting said gases with a catalyst according to claim 1, wherein the number of internal reinforcing vanes meeting in the center is 4.

3. A method of converting noxious components of exhaust gas to innocuous entities which comprises contacting said gases with a catalyst according to claim 1, wherein the number of internal reinforcing vanes meeting in the center is 6.

4. A method of converting noxious components of exhaust gas to innocuous entities which comprises contacting said gases with a catalyst according to claim 1, wherein the surface area is at least 100 $m^2/g$.

5. A method of converting noxious components of exhaust gas to innocuous entities which comprises contacting said gases with a catalyst according to claim 1, wherein the alkali metal is lithium and the amount of lithia deposited is about 0.5-3 wt. % $Li_2O$.

6. A method of converting noxious components of exhaust gas to innocuous entities which comprises contacting said gases with a catalyst according to claim 1, wherein the amount of ceria deposited is about 2-6 wt. % $CeO_2$.

7. A method of converting noxious components of exhaust gas to innocuous entities which comprises contacting said gases with a catalyst according to claim 1, wherein the platinum group metals comprise from about 1 to about 15 wt. % rhodium and from about 85 to 99 wt. % platinum, palladium or mixtures thereof.

* * * * *